United States Patent [19]

Whitehouse et al.

[11] Patent Number: 4,768,156
[45] Date of Patent: Aug. 30, 1988

[54] IMAGING SYSTEM

[75] Inventors: Harper J. Whitehouse, San Diego, Calif.; Donald L. Snyder, St. Louis, Mo.

[73] Assignee: The United States of America as represented by the Secretary of the Navy, Washington, D.C.

[21] Appl. No.: 861,490

[22] Filed: May 6, 1986

[51] Int. Cl.$^4$ .................... G06F 15/336; G06F 15/66
[52] U.S. Cl. .................................. 364/521; 342/179; 342/195; 382/42; 364/516
[58] Field of Search ............... 364/516, 518, 521, 728; 382/42; 342/25, 26, 179, 189, 195, 196, 197

[56] References Cited

U.S. PATENT DOCUMENTS

| | | | |
|---|---|---|---|
| 4,244,029 | 1/1981 | Hogan et al. | 382/42 |
| 4,470,048 | 9/1984 | Short, III | 342/189 |
| 4,602,348 | 7/1986 | Hart | 382/42 X |
| 4,673,941 | 6/1987 | Van Der Mark | 342/195 X |

OTHER PUBLICATIONS

Okuyama et al.: High Speed Digital Image Processor With Special Purpose Hardware for Two-Dimensional Convolution. Rev. Sci. Instr., Oct. 1979, pp. 1208–1212.
Baier et al.: Two Dimensional Convolution Processor, IBM Technical Disclosure Bulletin, vol. 26, No. 9, Feb. 1984, pp. 4807–4808.
D. L. Snyder, "Algorithms and Architectures for Statistical Image Processing in Emission Tomography," in: Real Time Signal Processsing VII, vol. 495, Society of Photo-Optical Instrumentation Engineers, pp. 109–111, 1984.
Prickett et al.: Principles of Inverse Synthetic Aperture Radar (ISAR) Imaging. IEEE Eascon Record, Sep. 1980, pp. 340–345.
J. Blaine et al., "Data Acquisition Aspects of Super-PETT," IEEE Trans. on Nuclear Science, vol. NS-29, pp. 544–547, Feb. 1982.
D. L. Snyder et al., "A Mathematical Model for Positron Emission Tomography Systems Having Time-of-Flight Measurements," IEEE Trans. on Nuclear Science, vol. NS-28, pp. 3575–3583, Jun. 81.
D. L. Snyder, "Some Noise Comparisons of Data-Collection Arrays for Emission Tomography-Systems Having Time-of-Flight Measurements," IEEE Trans. on Nuclear Science, vol. NS-29, No. 1, pp. 1029–1033, Feb. 1982.
D. L. Snyder and D. G. Politte, "Image Reconstruction From List-Mode Data in an Emission Tomography System Having Time of Flight Measurements," IEEE Trans. on Nuclear Science, vol. NS-20, No. 3, pp. 1843–1849, Jun. 1983.
M. Bernfeld, "CHIRP Doppler Radar," Proc. IEEE, vol. 72, No. 4, pp. 540–541, Apr. 1984.
D. L. Mensa et al., "Coherent Doppler Tomography For Microwave Imaging," Proc. IEEE, vol. 71, No. 2, pp. 254–261, Feb. 1983.
M. J. Prickett et al., "Stepped Frequency Radar Target Imaging," Private Correspondence.

Primary Examiner—Felix D. Gruber
Attorney, Agent, or Firm—Ervin F. Johnston; Thomas Glenn Keough

[57] ABSTRACT

An improved imaging system has applications to synthetic aperture radar, inverse synthetic aperture radar, delay-doppler radar, positron-emission topography sonar, radiometry and other applications having a target image provided by a series of data parameterized by a variable such as $\theta$. A receiver structure includes a bandpass matched-filter, square law envelope-detector, specialized processing and convolving to produce the improved images irrespective that the radar signals have practical side lobe structures and other features. Despite the demands of specialized processing the architecture of the algorithm permits real-time implementations.

7 Claims, 1 Drawing Sheet

Is illustrative of a 2-D Gaussian approximation to a 2-D ellipsoidal contour of the ambiguity function of the linear FM waveform.

$$H(\rho) \simeq \frac{c e^{-\alpha\rho^2}}{I_D(\beta\rho^2)}$$

IMAGING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a method and means for improving an imaging system. In greater particularity it is for a method and means for incorporating the operations of resolution enhancement and apriori information utilization simultaneously in the design of an improved imaging system. In still greater particularity it is to provide for an improved method and means for improving an imaging system that is adapted to imaging in a synthetic aperture radar, or in an inverse synthetic aperture radar, a radiometer, a sonar, an electromagnetic or acoustic tomographic system or a related system in which there is an interaction between the measurements that are being taken of physical phenomenon and the phenomenon which are being observed.

Recently an analogy has become recognized which exists between delay-doppler imaging-radar systems and tomographic systems used in clinical radiology. The analogy appears to hold the possibility of improving radar imaging because the use of matched filtering for noise suppression is suggested even by initial comparisons, and, more importantly because a line of thinking is emerging by which new mathematical models for the radar-imaging problem might be formulated and solved for improving processing. These new models account for dominant effects including noise. M. Bernfeld, in his article entitled "Chirp Doppler Radar" *Proceedings IEEE, Vol.* 72, No. 4 pp 540–541, April 1984, made a restricted form of this observation and the restricted form also appears in a different form in the work of D. Mensa, S. Halevy, and G. Wade in their article entitled "Coherent Doppler Tomography for Microwave Imaging" *Proceedings IEEE, Vol.* 71, No. 2 pp 254–261, February 1983. Both of these articles draw the analogy to a tomography system wherein the data available for processing are in the form of idealized, noise-free line-integrals through the object being imaged. This type of tomography system embraces a situation that is well approximated with X-ray tomography systems because X-ray sources can be highly collimated so as to form narrow X-ray beams of high intensity that are passed through the object being imaged. Although the analogy was articulated in these two articles, there is strong reason to believe that its applicability to practical radar/sonar signals of interest is limited because the ambiguity functions normally associated with such radar/sonar signals do not approximate line distributions in mass and thus do not permit the evaluation of line integrals of the scattering function. Two additional writings dealing with frequency-stepped, chirp-signals have discussions which clarify this limitation. M. Prickett, and C. Chen in "Principles of Inverse Synthetic Aperture Radar (ISAR) Imaging," *IEEE EASCON Record*, pp. 340–345, September 1980 and M. Prickett and D. Wehner in "Stepped Frequency Target Imaging", *Applications of Image Understanding and Spatial Processing to Radar Signals for Automatic Ship Classification Workshop*, New Orleans, La., February 1979 discuss side lobe structures and other features that cause a departure from idealized line-integrals and the fact that noise can be non-negligible in some radar-imaging situations. A solution was not evident, however. These articles are included in the Appendix for a reader's convenience.

Thus, there is a continuing need in the state-of-the-art for a method and means which may permit the removal of the restriction of noise-free line-integrals so that general magnitude squared ambiguity functions can be accommodated and the recognition of the effects of noise can be developed for improved imaging. In this discussion the ambiguity function is defined as the magnitude squared of the time-frequency autocorrelation or cross correlation function.

SUMMARY OF THE INVENTION

The present invention is directed to providing a means and method for improving the target imaging provided by a series of discrete data parameterized by a variable such as an angle $\theta$ in an imaging system which receives data representative of a physical phenomena and the pheonomena being observed and the interaction of data therebetween. Providing a plurality of discrete data inputs each for one of the series of discrete data enables a convolving-processing in parallel to generate two-dimensional preimage functions:

$$f_\theta(\tau,f) = \int\int p_\theta(\tau',f') w_\theta(\tau-\tau',f-f') d\tau' df'$$

where $f_\theta(\tau',f')$ as a function of $\theta,\tau',f'$ is the set of available data and $w_\theta$ are chosen by the system designer. Summing the two-dimensional preimage functions enables a convolving the summed functions with a circularly symmetric function h where h is obtained from the equation:

$$d(\tau,f) = \int\int h(\tau-\tau',f-f') p(\tau',f') d\tau' df,$$

where d is the desired response to a known distribution p. In particular if $p(\tau',f')$ is a two-dimensional delta function, then h is the point spread function of the imaging system.

A prime object of this invention is to improve the design of an imaging system.

Another object is to provide for an improved method and means for improving an imaging system relying on an interaction between the measurements taken of a physical phenomena and the phenomena which is being observed.

Still another object of the invention is to provide for an improved imaging system relying upon new processing algorithms implemented by associated circuitry that provide improved visualization of targets.

Another object is to provide for an improved method and means for imaging targets having specialized processing for real time implementations.

Yet still another object of the invention is to provide for an improved imaging system such as in a synthetic aperture radar, an inverse synthetic aperture radar, a sonar, an electrometric or acoustic tomographic system or related system having a target image provided by a series of data parameterized by a variable such as angle $\theta$.

These and other objects of the invention will become more readily apparent from the ensuing specification and drawing when taken in conjunction with the appended claims.

DESCRIPTION OF THE PREFERRED EMBODIMENTS

Figure 1:
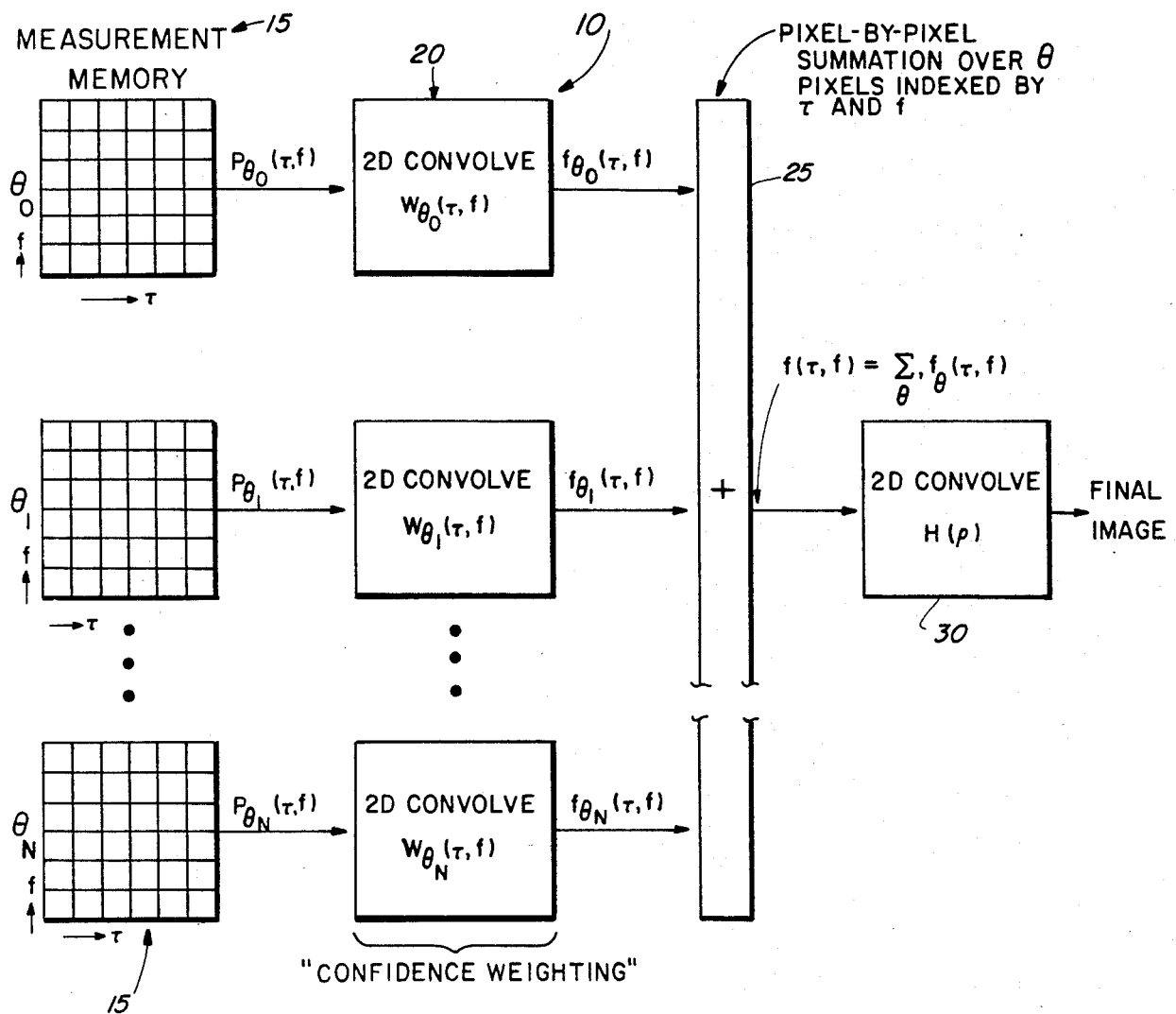
FIG. 1 is a schematic representation of a preferred form of the invention.

First, a mathematical analysis of radar imaging is presented and analogized to a related analysis concerning a tomographic imaging system. These two technological discussions are set forth to provide a thorough appreciation of the salient features of a specific embodiment of this inventive concept. It is of course understood that the analogies of these systems and a consequent improvement by the inclusion of this inventive concept are also applicable to imaging synthetic aperture radar, inverse synthetic aperture radar, radiometric systems, sonar systems or other devices in which there is an interaction between the measurements that are being taken of the physical phenomenon and the phenomenon which are being observed. More specifically this improvement can be incorporated in systems which enable the taking of a series of measurements not identically repeating the same measurements but paramaterized by a variable which is generally designated as an angle $\theta$. This need not necessarily be a physical angle in the case of an inverse synthetic aperture radar but could be the angle made by the ambiguity function of the chirp waveform relative to the delay axis on each successive transmission and is the chirp rate of the actual signal transmitted. In the case of a radiometer it is the real angle in which the radiometer observes the scene of which it is trying to form an image.

In other words, this concept applies to a system in which there exists a free parameter called an angle $\theta$ and that a series of measurements is made, each one of these measurements at a different angle of $\theta_1, \ldots \theta_n$. It is recognized that each measurement may itself be a series of submeasurements in which the angle is held constant so as to improve the quality of the measurement at that angle. What is being described is the combination of these multiple measurements and a reconstruction algorithm which has the capability of providing high resolution and simultaneously the incorporation of apriori knowledge. For example, in conventional X-ray tomography an attenuation projection can be measured that is an integral of some physical property, a scattering cross-section is measured in the case of an inverse synthetic aperture radar and a voluminous flux projection is measured in the case of a radiometer. A set of integrals is available for these functions. The fundamental theorem forming the subject matter of this improvement is the radon inversion lemma which says that a Fourier transform of this observation of the one-dimensional projections is represented as a slice through the two-dimensional Fourier transform of the distribution that is trying to be measured. This, however, standing by itself is equivalent to having no additional information available and, therefore, the evaluation of the inverse radon transform tends to be numerically unstable and is equivalent to doing numerical differentiation.

However, addition apriori information often is available. For example, we know the range resolution in the case of an inverse synthetic aperture radar, or when cross-bearing fixes are provided in the case of a radiometer, they give an indication of the approximate range. This apriori information can be incorporated in precisely the same way that it is incorporated in the positron emission tomography that is referenced herein and discussed in greater detail below. That is to say, that instead of doing a back projection which is a transformation of a one-dimensional data field into a two-dimensional data field by spreading the one-dimensional data field everywhere parallel to itself into two-dimensions, the information is spread in a region determined by the available apriori knowledge. This apriori knowledge indicates a probability that the information is more likely to be known in one region than it is in another region and therefore it is not necessary to spread the information uniformly over lines in the two-dimensional plane by back projection. This operation is referred to with respect to positron emission tomography as "confidence weighting" but may be interpreted as being a weighting of the information according to whatever form of apriori knowledge that is available that indicates that the information is more likely to be encountered in one portion of the plane than uniformly along lines (back projection) in the plane.

Radar imaging has been typified and characterized by a number of parameters. These are discussed at length by H. L. Van Trees in his text "*Detection, Estimation, and Modulation Theory: Vol. 3*, John Wiley and Sons, New York, 1971. The parameter $\rho(\tau,f)$ is the target scattering-function which is the average reflectivity as a function of delay $\tau$ and doppler f, see pp. 448 of the Van Trees text. The parameter $a(\tau,f)$ denotes the ambiguity function of the transmitted radar-signal, (page 279 of Van Trees). In the absence of noise, the output $p(\tau,f)$ of a radar receiver consisting of a bandpass matched-filter (BPMF) matched to the transmitted radar signal) followed by a square-law envelope-detector (SLED) is the convolution of the target scattered function and the ambiguity function of the transmitted signal. Throughout this inventive concept, ambiguity function, $a(\tau,f)$ refers to the *magnitude squared* ambiguity function as elucidated in somewhat different notation in the Van Trees text. These expressions are set forth on pages 462 and 463 of the Van Trees text and form the basis for:

$$p(\tau,f) = \int \int \rho(\tau',f') a(\tau - \tau', f - f') d\tau' df'. \quad (1)$$

For the delay-doppler radar-imaging problem without noise, a sequence of target illuminations by chirp-FM signals is considered. Each of the chirp-FM signals has a different chirp rate. The effect of changing the chirp rate of a signal on its ambiguity function is to rotate the ambiguity function to an angle $\theta$ in the delay-doppler plane, (page 291 of Van Trees). This dependency is indicated in equation (1) by changing the notation:

$$p_\theta(\tau,f) = \int \int \rho(\tau',f') a_\theta(\tau - \tau', f - f') d\tau' df' + n(\tau,f) \quad (2)$$

where $\theta$ is determined by the chirp rate relative to the radar pulse without chirp-FM and $n(\tau,f)$ is an undesired, naturally occurring contaminating noise function which is to be minimized according to well established techniques. The noise-free radar-imaging problem arises in the observation of the output of the BPMF-SLED receiver, $p_\theta(\tau,f)$ for a sequence of target illuminations having different chirp-FM rates, $\theta = \theta_0, \theta_1, \ldots \theta_n$ and to determine the scattering function $\rho(\tau,f)$.

To elaborate, in the case of the chirp waveform, the angle is not the real angle as it would be in the case of trying to do a triangulation with a radiometer or doing the actual physical measurement in the positron emission tomograph. The chirp waveform angle is a valid parameter, however. It has been known in the art since the fundamental paper by Klauder in the Bell System Technical Journal in 1960 in that the response of a radar to a chirp waveform is parmeterized by a chirp rate number. This chirp rate number, the rate at which the frequency is changing, parameterizes the ambiguity function, that is, its ability to localize as a function of delay and doppler, which is inclined in the delay doppler plane at a physical angle proportional to the chirp rate, which is the mathematical parameter that describes how fast the chirp changes. Stated in another way, if the chirp does not change at all, the angle is 0 and then one has the ability to localize precisely in doppler because there is an equivalency to a continuous sample of a sinusoid and there is almost no ability to resolve as a function of delay. As the chirp rate is increased, range and doppler are coupled together so that a two-dimensional surface is defined which relates the ability of the waveform to resolve the target. By analogy to the usage for optical imating systems, the term "point spread function" can be used to describe this quantity since the ability of the radar to resolve a single point target is being described and is ambiguous in the sense that some of the targets at a near range will be received by the radar precisely the same way for their doppler as the targets at a larger range will be received with their doppler. That is, the target point gives rise to a response surface with a contour which is an ellipse whose major axis is along the line in range delay doppler space parameterized by the angle $\theta$.

Recent developments in positron-emission tomographic imaging systems have a relation analogous to equation (2). In these tomographic systems a positron-emitting radionuclide is introduced inside a patient, and the resulting activity is observed externally with an array of scintillation detectors surrounding the patient in a planar-ring geometry. When a positron is produced in a radioactive decay, it annihilates with an electron producing two high energy photons that propagate in opposite directions along a line. In the first system employing positron emission, the line-of-flight of the two oppositely propagating photons is sensed for each detected event. The data attributed to these events are organized according to their propagation angle and processed with the same algorithms used in X-ray tomography. The result is an estimate of the two-dimensional spatial distribution of the radionuclide within the patient in the plane of the detector ring. Recent developments attributed to improvements in high-speed electronics and detector technology have made it feasible to measure the useful accuracy not only of the line-of-flight of annihilated photons but also their differential time-of-flight. As a consequence, in the absence of noise, the measurements are in the form of information of equation (2) with $\rho(\tau,f)$ being a two-dimensional activity distribution to be imaged and with $a_\theta(\tau,f)$ being the error density associated with measuring the location of an annihilation event. In this regard $\rho(\tau,f)$, $a_\theta(\tau,f)$, and $p_\theta(\tau,f)$ correspond to $\lambda(x)$, $p_\epsilon(x/\theta)$, and $\mu(n,\theta)$, respectively, where x and $\mu$ are two-dimensional vectors. These parameters and their applicability to positron emission tomography systems are explained in the article by D. L. Snyder, L. J. Thomas, Jr., and M. M. Ter-Pogossian entitled "A Mathematical Model for Positron Emission Tomography Systems Having Time-of-Flight Measurements" *IEEE Transactions on Nuclear Science, Vol., NS-28*, pp. 3575–3583, June 1981, see the appendix.

The noise-free imaging problem of emission tomography is to observe the line-of-flight and the time-of-flight of the sequence of detected annihilation photons, modeled on the average by $p_\theta(\tau,f)$ in equation (2) and to determine the two-dimensional activity distribution $\rho(\tau,f)$. Here, the parameter $a_\theta(\tau,f)$ is a known function determined by instrumentation errors and $p_\theta(\tau,f)$ is the number of detected events having a line-of-flight with angle $\theta$ and differential time-of-flight corresponding to position $(\tau,f)$ along the line-of-flight. In a recent experiment the data has been quantized to ninety-six angles ($\theta_i = 180i/96$, i=0, 1, ..., 95) and to 128-by-128 positions collected in an instrument being developed at Washington University and discussed by J. Blaine, D. Ficke, R. Hitchens, and T. Holmes in their article "Data Acquisition Aspects of Super-PETT," *IEEE Transactions on Nuclear Science Vol. NS-29*, pp. 544–547, February 1982, see the Appendix.

The error density $a_\theta(\tau,f)$ is determined by both the physical size of the crystals used in the scintillation detectors (resulting in about a 1-centimeter uncertainty transverse of the line-of-flight) and the timing resolution of the electronic circuitry used to measure the differential propogation-time (resulting in about a 7-centimeter spatial uncertainty along the line-of-flight). For present systems, this density is reasonably modeled by a two-dimensional, elliptically assymetric Gaussian-function having its major axis oriented with the line-of-flight and its minor axis oriented transversely to this.

For the radar-imaging problem this density corresponds to the ambiguity function of a radar pulse having an envelope that is a Gaussian function and an instantaneous frequency that is a linear function of time and the phase which is a quadratic function of time.

From the foregoing for an improved delay-doppler radar-imaging system certain assumptions must be made, the first of which is that the target is illuminated by a sequence of radar pulses each having a distinct FM-chirp rate corresponding to angles $\theta = \theta_0, \theta_1, \ldots, \theta_n$ spanning the range from 0°–180°. A BPMF-SLED receiver produces data $p_\theta(\tau,f)$ for $\theta_0, \theta_1, \ldots, \theta_n$ and quantized values of $(\tau,f)$. The problem that remains is to estimate the target scattering function $\rho(\tau,f)$ using the relationship stated in equation (2). For emission-tomography imaging when both time-of-flight and line-of-flight information are available, event data is provided which is representative of $p_\theta(\tau,f)$ at angles $\theta = \theta_0, \theta_1, \ldots, \theta_n$ spanning 0–180 and quantized to values of $(\tau,f)$. The measurement-error density $a_\theta(\tau,f)$ is known. The activity distribution $\rho(\tau,f)$ is to be estimated using the relatinship in equation (2). In both cases, the delay-doppler radar-imaging and the emission-tomography imaging, the activity distribution $\rho(\tau,f)$ need be estimated using the relationship expressed in equation (2).

A number of preliminary considerations must be examined and defined to allow a more thorough comprehension of the improvement of this inventive concept. Part of the solution for improving the radar, tomography, sonar, or radiometer image lies in developing an appropriate algorithm for suitable processing of an output signal from a known BPMF-SLED receiver. The algorithm is derived by applying statistical-estimation theory to a mathematical model that accounts for the noise and other effects seen in an emission-tomography system having time-of-flight measurements. The algorithm for solving equation (2) above was proposed by D. L. Snyder et al in their article referenced above. This algorithm was evaluated in a later writing by Snyder "Some Noise Comparisons of Data-Collection Arrays for Emission Tomography-Systems Having Time-of-Flight Measurements" *IEEE Transactions on Nuclear Science*, Vol. NS-29, No. 1, pp. 1029–1033, February 1982 and by Politte and Snyder in the article "A Simulation Study of Design Choices in the Implementation of Time-of-Flight Reconstruction Algorithms" *Proceedings Workshop on Time-of-Flight Tomography*, Washington University, May 1982, published by the IEEE Computer Society, IEEE Catalog No. CH1791-3, please see these articles in the Appendix.

The noise was found to be Poisson distributed as might be expected because of the quantum nature of radioactivity decay, an effect well modeled by a Poisson process with intensity $\rho(\tau,f)$ proportional to the concentration of the radioactive source. It is argued in the earlier referenced D. L. Snyder et al article that the measured data (that is, line- and time-of-flight of annihilation photons) are also Poisson distributed, with the intensity being $p_\theta(\tau,f)$ in equation (2). Maximum-likelihood estimation is then used to estimate $\rho(\tau,f)$. An extension of this algorithm development is discussed in a later article by D. L. Snyder et al entitled "Image Reconstruction from List-Mode Data in an Emission Tomography System Having Time-of-Flight Measurements" *IEEE Transactions on Nuclear Science*, Vol. NS-20, No. 3, pp. 1843–1849, June 1983, see Appendix. The extended algorithm development is said to enable far more accurate reconstructions at the expense of greatly increased computation.

Neglecting the effects of noise and statistical fluctuations in the measurement data enable the expression of $p_\theta(\tau,f)$ as the measurement described above. The improved imaging system 10 for enhanced radar imaging, radiometer imaging, sonar imaging, and the like adapts itself to the established state-of-the-art and improves thereon, see FIG. 1. The output $p_\theta(\tau,f)$ of a BPMF-SLED receiver, schematically represented as memory 15, is three-dimensional because it is a function of the three idependent variables $\theta$, $\tau$, and f. The target image sought, $\rho(\tau,f)$ however, is two-dimensional. Thus, a three-dimensional to two-dimensional transformation of $p_\theta(\tau,f)$ is required as part of the improved processing.

The improved processing is accomplished in two steps. The first step is to form a two-dimensional "preimage array" 20. This is accomplished by convolving the data $p_\theta(\tau,f)$ obtained at each FM-chirp rate $\theta$ with a weighting function $w_\theta(\tau,f)$ and then summing the results over $\theta$; that is we form the functions $$f_\theta(\tau,f) = \int\int p_\theta(\tau',f')w_\theta(\tau-\tau',f-f')d\tau'df' \quad (3)$$

from which a two-dimensional preimage $f(\tau,f)$ is derived according to $$f(\tau,f) = \int_0^\pi f_\theta(\tau,f)d\theta \approx \Sigma f_\theta(\tau,f). \quad (4)$$

The formation of this preimage corresponds to some extent with the back-projection step of the "unfiltered back-projection, post two-dimensional filtering" approach to idealize line-integral tomography. Examples of weighting functions that might be adapted are:

$$w_\theta(\tau,f)=(\delta\tau\delta f)^{-1}I_{\delta\tau}(\tau)I_{\delta f}(f). \quad (4a)$$

where, $$I_{\delta\tau}(\tau)I_{\delta f}(f)=1, \ |\tau|\leq\delta\tau/2, \ |f|\leq\delta f/2=0, \text{ otherwise.} \quad (4b)$$

Here, $w_\theta(\tau,f)$ is unity for delays and dopplers in a small bin located at $\tau$ and f in the delay-doppler plane and is zero otherwise, independently of the sweep rate $\theta$. In this case, $f_\theta(\tau,f)$ equals $p_\theta(\tau,f)$, and the preimage is $$f(\tau,f) = \int_0^\pi p_\theta(\tau,f)d\theta \approx \Sigma_\theta p_\theta(\tau,f). \quad (4c)$$

This choice of $w_\theta(\tau,f)$ might be reasonable if the ambiguity function $a_\theta(\tau,f)$ is concentrated about the origin $(\tau,f)=(0,0)$, which requires a signal with a large time-bandwidth product. Then, $p_\theta(\tau,f)$ equals $\rho(\tau,f)$, and the preimage is obtained simply by post detection integration in each delay-doppler bin without further processing.

Give $w_\theta(\tau,f)$ a value of unity for values of delay and doppler within a narrow strip of width $\delta$ passing through the origin of the delay-doppler plane at angle $\theta$ and $w_\theta(\tau,f)$ a value of zero otherwise Then $f_\theta(\tau,f)$ is a strip integral, or line integral for $\delta$ small, through the data $p_\theta(\tau,f)$, which corresponds to unfiltered back-projection in tomography.

A confidence weighting function $w_\theta(\tau,f)=a_\theta(\tau,f)$ is used to form the preimage as suggested from the positron-emission tomography experience. This corresponds to taking the value of the BPMF-SLED signal $p_\theta(\tau,f)$ shown in the drawings as coming from measurement memories 15 at each value of delay and doppler $p_{\theta1}(\tau,f)\ldots p_{\theta96}(\tau,f)$ and distributing the values over the delay doppler plane according to the ambiguity function $a_\theta(\tau,f)$. This approach is the one now used routinely in emission-tomography systems having time-of-flight data. If the mathematical development of the cited Snyder et al paper on mathematical modeling carries over the radar-imaging problem, the choice of the weighting function is motivated by noting that the resulting $f_\theta(\tau,f)$ is the maximum-likelihood estimate of the delay-doppler reflectance in the target that led to the measurement $p_\theta(\tau,f)$ assuming apriori that $\rho(\tau,f)$ is uniform.

The second processing step in the imaging approach relies on the summing of the preimage outputs in a summer 25 and the deriving of a target image from the preimage in a convolver 30. Such a target image resolution is provided within a resolution function $h(\tau,f)$, which defines a "desired image" according to $$d(\tau,f)=\int\int h(\tau-\tau',f-f')\rho(\tau',f')d\tau df. \quad (4d)$$

It has been found that including such a resolution function is important in processing emission-tomography data as a way to trade off resolution and smoothing for noise suppression. A narrow two-dimensional, circularly symmetric Gaussian resolution-filter is used as convolver 30. Let $\hat{d}(\tau,f)$ denote the estimate of $d(\tau,f)$ obtained by processing the preimage $f(\tau,f)$. Also let $\hat{D}(u,v)$ and $F(u,v)$ denote the two-dimensional Fourier transforms of $\hat{d}(\tau,f)$ and $f(\tau,f)$, respectively. Thus:

$$\hat{D}(u,v)=H(u,v)F(u,v)/G(u,v), \quad (5)$$

where H(u,v) (see FIG. 2) is the transform of $h(\tau,f)$ and G(u,v) is the transform of the function $g(\tau,f)$ defined according to $$g(\tau,f) = (1/\pi) \int_0^\pi a_\theta(\tau,f) w_\theta(\tau,f) d\theta. \qquad (6)$$

Figure 2:
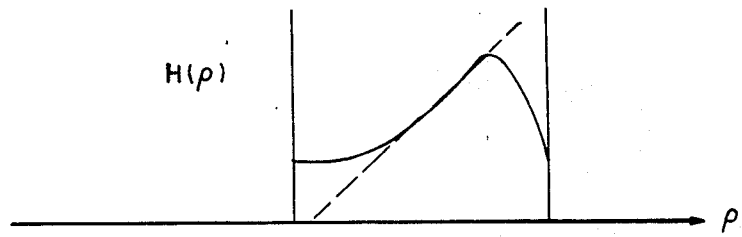
FIG. 2 is illustrative for a 2D Gaussian approximation of the 2D ellipsoidal contour of the ambiguity function of the linear FM waveform.

FIG. 2 is illustrative for the 2D Gaussian approximation for the 2D ellipsoidal contour of the ambiguity function of the linear FM waveform. This required filter function is provided for a general 2D contour in accordance with established techniques.

The image $\hat{d}(\tau,f)$ is obtained from $\hat{D}(u,v)$ by a two-dimensional, inverse Fourier transformation. The functions $g(\tau,f)$ and $G(u,v)$ are precomputable since they depend only on the ambiguity function and the weighting function used to form the preimage and not on the measured data.

For the choice of the weighting function:

$$w_\theta(\tau,f) = a_\theta(\tau,f), \qquad (6a)$$

the function $g(\tau,f)$ is the average over $\theta$ of the square of the ambiguity function $a_\theta(\tau,f)$ is a two-dimensional asymmetric Gaussian function, and $g(\tau,f)$ is a Bessel function. The derivation does not require that $a_\theta(\tau,f)$ be Gaussian, but $g(\tau,f)$ will usually need to be evaluated numerically for practical ambiguity functions.

The processing thusly described lends itself to the radar-imaging enhancement and is motivated by the processing derived from a mathematical model for the emission-tomography imaging problem. The end result is an improved imaging for radar doppler, radiometric sonar and the like information gathering systems.

The architecture suggested by the algorithm defined by equation (3) through (6) above is similar to that discussed in a later article by D. L. Snyder entitled "Algorithms and Architectures for Statistical Image Processing in Emission Tomography" *Real Time Signal Processing VII, Vol.* 495, Society of Photo-Optical Instrumentation Engineers, pp. 109–111, 1984, see the Appendix. Data acquired for each doppler rate can be processed in parallel and then combined to form $f(\tau,f)$ according to equation (4) and the processing in equation (3) required for each doppler rate can be pipelined. The processing implemented in current emission-tomographs is performed in the spatial rather than the Fourier domain. The algorithm has been implemented by a computer, for example, a Perkin-Elmer 3242 computer with a floating point processor but no array processor. Two convolutions and a division are required at each stage for each of the data gatering angles. Simultaneous processing can be performed and pipelined for each angle.

Obviously many modifications and variations of the present invention are possible in the light of the above teachings such as substituting magnitude in place of magnitude squared. It is therefore to be understood that within the scope of the appended claims the invention may be practiced otherwise than as specifically described.

APPENDIX

List of Patents, Publications & Information

I. "Algorithms and Architectures for Statistical Image Processing in Emission in Tomography" by D. L. Snyder pages 109–111, 1984
Real Time Signal Processing VII, Vol. 495,
Society of Photo-Optical Instrumentation Engineers II. "Data Acquisition Aspects of Super-PETT",
by J. Blaine et al.
IEEE Trans. on Nuclear Science,
Vol. NS-29, pages 544–547, February 1982

III. "A Mathematical Model for Positron Emission Tomography Systems Having Time-of-Flight Measurements",
by D. L. Snyder et al.
IEEE Trans. on Nuclear Science,
Vol. NS-28, pages 3575–3583, June 1981

IV. "Some Noise Comparison of Data-Collection Arrays for Emission Tomography-Systems Having Time-of-Flight Measurements",
by D. L. Snyder
IEEE Trans. on Nuclear Science,
Vol. NS-29, pages 1029–1033, February 1982

V. "Image Reconstruction from List-Mode Data in an Emission Tomography System Having Time-of-Flight Measurements"
by D. L. Snyder et al.
IEEE Trans, on Nuclear Science,
Vol. NS. 20, No. 3,
pages 1843–1849, June 1983

VI. "CHIRP Doppler Radar",
by M. Bernfeld,
Proc. IEEE,
Vol. 72, No. 4, pages 540–541, April 1984

VII. "Coherent Doppler Tomography for Microwave Imaging",
by D. L. Mensa et al.
Proc. IEEE, Vol. 71, No. 2,
pages 254–261, February 1983

VIII. "Stepped Frequency Radar Target Imaging",
by M. J. Prickett et al.
(private correspondence)

IX. "Principles of Inverse Synthetic Aperture Radar (ISAR) Imaging",
by M. J. Prickett et al.
IEEE EASCON Record,
pages 340–345, September 1980

What is claimed is:

1. An apparatus for improving the target provided by a series of discrete target image data signals parameterized by a variable such as an angle $\theta$ comprising:

means for providing a plurality of target image data input signals $p_\theta(\tau f)$ each for one of the series of discrete target image data signals;

means coupled to a separate input providing means for processing the target image data input signals in total to generate separate two-dimensional preimage functions $f(\tau,f)$;

means for summing the two-dimensional preimage functions;

means coupled to summing means for convolving the summed preimage functions with a response function to form an improved target image signal according to the equation $$d(\tau,f) = \int\int h(\tau - \tau', f - f') p(\tau', f') d\tau' df'$$

that has equivalence as $$D(u,v) = H(y,v)F)u,v)/G(u,v)$$

in Fourier transform notation where H(u,v) is the Fourier transform of $h(\tau,f)$; and means coupled to the convolving means for controlling the display of an enhanced image in response to the improved target image signal.

2. An apparatus according to claim 1 in which each of the target image data input signal providing means is fabricated to provide a separate one of the target image data input signals from a separate one of the series of discrete target image data signals to be characterized by the function:

$$p_\theta(\tau,f) = \int\int p(\tau',f')a_\theta(\tau-\tau',f-f')p(\tau',f')d\tau'df',$$

over $\theta$ angle $=\theta_o \ldots \theta_n$.

3. An apparatus according to claim 2 in which each of processing means is fabricated to convolve the data $p_{\theta 1}(\tau,f) \ldots p_{\theta n}(\tau,f)$ with a confidence weighing function $w_\theta(\tau,f)$ to form the functions:

$$f_\theta(\tau,f) = \int\int p_\theta(\tau',f')w_\theta(\tau-\tau',f-f')d\tau'df',$$

and the summing means sums over the angle $\theta$ to obtain the summed two-dimensional preimage function of:

$$f(\tau,f) = \int_o^\pi f_\theta(\tau,f)d\theta$$

which optionally is expressed as the approximate expression $$f(\tau,f) \approx \Sigma f_\theta(\tau,f).$$

4. An apparatus according to claim 3 in which the convolving means is a two-dimensional, circularly symmetrical Gaussian resolution-filter whose impulse response is the solution computed by a two-dimensional, inverse Fourier transformation expressed as $$g(\tau,f) = (1/\pi) \int_0^\pi a_\theta(\tau,f)w_\theta(\tau,f)d\theta$$

that has equivalence as a two-dimensional, circularly symmetrical Gaussian resolution-filter which satisfies the equation:

$$\hat{D}(u,v) = H(u,v)F(u,v)/G(u,v)$$

where $G(u,v)$ is the Fourier transform of $g(\tau,f)$.

5. A method of improving a target image from a series of discrete target image data signals parameterized by a variable such as an angle $\theta$ comprising:
  providing a plurality of discrete target image data input signals each for one of the series of discrete target image data signals and each target image data input signals expressed as:

$$p_\theta(\tau,f) = \int\int p(\tau',f')a_\theta(\tau-\tau',f-f')d\tau'df' + n(\tau,f)$$

where $n(\tau,f)$ is an undesired naturally occurring noise function over $\theta$ angle $=\theta_o \ldots \theta_n$;
  processing in total the plurality of series of discrete target image data input signals to generate two-dimensional preimage functions $f_o(\tau,f)$;
  summing the plurality of two-dimensional preimage functions; convolving the summed plurality of two-dimensional preimage functions into an improved target image signal corresponding to the function $$d(\tau,f) = \int\int h(\tau-\tau',f-f')p(\tau',f')d\tau df;$$

and controlling the display of the improved target image signal to provide an improved target image on a viewing screen.

6. A method according to claim 5 in which the step of processing convolves each discrete target image data input signals $p_\theta(\tau,f)$ with a weighting function $w_\theta(\tau,f)$ to be expressed as:

$$f_\theta(\tau,f) = \int\int p_\theta(\tau',f')w_\theta(\tau-\tau',f-f')d\tau'df',$$

to each obtain the two-dimensional preimage function of:

$$f(\tau,f) = \int_0^\pi f_\theta(\tau,f)d\theta$$

for angle $\theta=\theta_o \ldots \theta_n$ which optionally is expressed as the approximate expression:

$$f(\tau,f) \approx \Sigma f_\theta(\tau,f).$$

7. A method according to claim 6 in which the step of convolving with a circularly symmetric response function relies on a two-dimensional circularly symmetrical Gaussian resolution-filter computed by a two-dimensional inverse Fourier transformation expressed as:

$$g(\tau,f) = (1/\pi) \int_0^\pi a_\theta(\tau,f)w_\theta(\tau,f)d\theta$$

that has an equivalence as a two-dimensional, circularly symmetrical Gaussian resolution-filter which satisfies the equation:

$$\hat{D}(u,v) = H(u,v)F(u,v)/G(u,v)$$

where $G(u,v)$ is the Fourier transform of $g(\tau,f)$.

* * * * *